United States Patent
Bauer et al.

(10) Patent No.: US 9,841,158 B2
(45) Date of Patent: Dec. 12, 2017

(54) LIGHT MODULE WITH TWO OR MORE REFLECTORS FOR A MOTOR VEHICLE

(71) Applicant: ZIZALA LICHTSYSTEME GMBH, Wieselburg (AT)

(72) Inventors: Friedrich Bauer, Bergland (AT); Peter Mejta, Purgstall/Erlauf (AT)

(73) Assignee: ZKW GROUP GMBH, Wieselburg an der Erlauf (AT)

( * ) Notice: Subject to any disclaimer, the term of this patent is extended or adjusted under 35 U.S.C. 154(b) by 141 days.

(21) Appl. No.: 14/431,241

(22) PCT Filed: Sep. 13, 2013

(86) PCT No.: PCT/AT2013/050183
§ 371 (c)(1),
(2) Date: Mar. 25, 2015

(87) PCT Pub. No.: WO2014/056012
PCT Pub. Date: Apr. 17, 2014

(65) Prior Publication Data
US 2015/0241011 A1 Aug. 27, 2015

(30) Foreign Application Priority Data
Oct. 9, 2012 (AT) .............................. A 1094/2012

(51) Int. Cl.
*F21S 8/10* (2006.01)

(52) U.S. Cl.
CPC ....... *F21S 48/1305* (2013.01); *F21S 48/1159* (2013.01); *F21S 48/137* (2013.01); *F21S 48/1335* (2013.01); *F21S 48/1388* (2013.01); *F21S 48/1394* (2013.01); *B60Q 2200/36* (2013.01); *F21S 48/328* (2013.01)

(58) Field of Classification Search
CPC ..... F21S 48/1305; F21S 48/1757; F21V 7/16; F21V 7/18; F21V 17/164; F21V 17/017
See application file for complete search history.

(56) References Cited

U.S. PATENT DOCUMENTS

| | | | | |
|---|---|---|---|---|
| 5,613,761 | A * | 3/1997 | Raby, Sr. | F21V 7/005 359/846 |
| 6,030,101 | A * | 2/2000 | Sobeck | B60Q 1/0047 362/288 |
| 8,622,597 | B2 * | 1/2014 | Tseng | F21S 48/1159 362/515 |
| 8,632,233 | B2 * | 1/2014 | Kawamura | F21S 48/1145 362/517 |
| 2004/0066655 | A1 * | 4/2004 | Raby | F21V 7/005 362/296.02 |

(Continued)

*Primary Examiner* — Andrew Coughlin
*Assistant Examiner* — Eric T Eide
(74) *Attorney, Agent, or Firm* — Eversheds Sutherland (US) LLP

(57) ABSTRACT

The invention relates to a light module (1) for a motor vehicle or for a motor vehicle headlamp, wherein the light module (1) has at least two or more light sources (10, 11), which are positioned in defined positions relative to one another, and wherein the light module (1) also has two or more reflectors (20, 21), wherein at least one reflector (20, 21) is associated with each light source (10, 11), wherein at least one of the reflectors (20, 21) is movably connected to at least one adjacent reflector (20, 21).

17 Claims, 4 Drawing Sheets

(56) References Cited

U.S. PATENT DOCUMENTS

Figure 1:
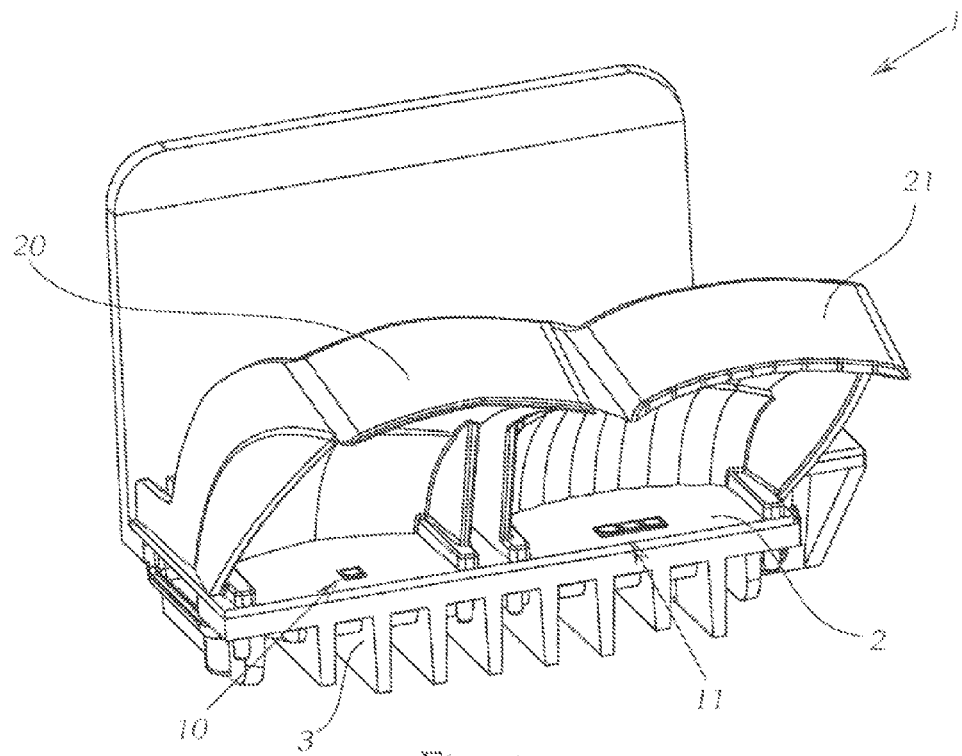

| | | | | |
|---|---|---|---|---|
| 2011/0141733 A1* | 6/2011 | Senn | ............... | A61C 19/004 |
| | | | | 362/235 |
| 2011/0199769 A1* | 8/2011 | Bretschneider | ........... | F21V 7/22 |
| | | | | 362/249.02 |
| 2011/0242822 A1* | 10/2011 | Rong | ............. | F21V 5/007 |
| | | | | 362/346 |
| 2012/0051037 A1* | 3/2012 | Lin | ............. | F21S 2/00 |
| | | | | 362/217.14 |
| 2013/0215632 A1* | 8/2013 | Jackl | ............. | F21S 48/1109 |
| | | | | 362/514 |
| 2016/0288696 A1* | 10/2016 | Kreml | ............. | B60Q 1/08 |

* cited by examiner

LIGHT MODULE WITH TWO OR MORE REFLECTORS FOR A MOTOR VEHICLE

The invention relates to a light module for a motor vehicle or for a motor vehicle headlamp, wherein the light module has at least two or more light sources, which are positioned in defined positions relative to one another, and wherein the light module also has two or more reflectors, wherein at least one reflector is associated with each light source.

The invention also relates to a vehicle headlamp having one or more such light modules.

Two or more independent LED light sources are often provided on an LED circuit board, wherein a dedicated reflector is associated with each LED light source. For reasons concerning logistics and storage, double or multiple reflectors are often used for such applications. Due to the embodiment of two or more reflectors in a component, the logistical outlay can be significantly reduced. A cost saving can also be made in this way, since only one tool has to be constructed.

It is often necessary on account of optical requirements that each LED light source is referenced in relation to its reflector, that is to say is positioned and/or aligned accordingly.

However, in the case of double or multiple reflectors it is only possible to reference one of the reflectors in relation to its LED light source, whereas the position of the other reflectors is then determined by the position of this referenced reflector. Accordingly, a referencing of all reflectors in relation to their LED light sources is not possible.

Fitting the LED circuit board with the LED light sources following the mounting of the double or multiple reflectors, that is to say a referencing of the LED light sources in relation to the reflectors (and not vice versa), is not a viable approach in practice.

Accordingly, individual reflectors are often used in practice, or there is no referencing of the individual reflectors, but instead an adjustment on the production line via the optics/lighting technology, i.e. the reflectors are brought into a position that generates the desired light exposure and the reflectors are fixed in this position. To this end, however, complex adjustment mechanisms and adjustment facilities are necessary, which are often also very error-prone.

The object of the invention is to enable optimal referencing of two or more reflectors in relation to their respective associated light source, wherein at the same time logistics and storage are to be significantly simplified compared with the use of individual reflectors.

This object is achieved with a light module as mentioned in the introduction in that, in accordance with the invention, at least one of the reflectors is movably connected to at least one adjacent reflector.

In accordance with the invention a double or multiple reflector is created, with which at least two reflectors are movable, that is to say are interconnected in a flexible manner, such that at least these two reflectors can be positioned independently of one another to a certain extent and thus can also be referenced optimally in relation to their respective associated light sources.

It is advantageous if at least one reflector is movably connected to all adjacent reflectors. By way of example, in the case of three reflectors the "middle" reflector would be movably connected to both adjacent reflectors.

It is particularly advantageous if at least each reflector is movably connected to the reflectors adjacent thereto. In the case of n reflectors there are then (n−1) movable connections between the n reflectors.

In this way, each reflector can be referenced.

In accordance with a specific embodiment of the invention the reflectors movable relative to one another are arranged laterally adjacently, i.e. the plane(s) in which the reflectors are positioned are typically substantially horizontal in the installed position of the light module. All reflectors (and light sources) typically lie in one plane, however two or more, preferably parallel planes may also be provided.

The term "laterally" adjacently relates here to the plane(s) in which the reflectors are arranged (reference will be made hereinafter just to "the" plane, although parallel planes may also be intended). If this plane, which is generally formed by an LED circuit board, is arranged horizontally, the reflectors thus are actually arranged laterally adjacently. If the LED circuit board is installed for example at 90° to the horizontal, i.e. vertically, the reflectors are still arranged "laterally" adjacently in relation to the circuit board, but are arranged one above the other in the installed position. This will of course also be included by the term "laterally".

Here, the interconnected reflectors are preferably arranged movably relative to one another in a plane. This plane is preferably the plane (or parallel thereto) in which the reflectors are fastened, or this plane is parallel to the planes in which the reflectors are fastened.

Here, the expression mounted movably "in a plane" means that, with (theoretically) a first reflector fixed in this plane, the other reflector or reflectors mounted movably on this first reflector can only still be adjusted/displaced parallel to this plane to the extent permitted by the connection between the reflectors. A relative movement of the reflectors normal to this plane may be possible to a small extent.

This is a specific embodiment in which the reflectors are movable relative to one another parallel to the above-mentioned plane; no movement or only a small movement is possible normal to this plane.

However, it may also be deliberate that a movement in a direction normal to this plane is also possible in addition, or that only a movement in this direction is possible. A reflector chain in which some reflectors are adjustable relative to one another parallel to the LED circuit board, whereas other reflectors are movable normal to one another would thus be conceivable. This would be conceivable for example with a step-like arrangement of the reflectors.

In principle arrangements can thus be provided in which the reflectors are arranged laterally adjacently and/or at an incline to one another and/or one above the other or one below the other.

By contrast, in a simple embodiment of the invention, all movable reflectors are mounted movably in a common plane.

In accordance with a specific embodiment of the invention reflectors movably connected to one another are interconnected by means of at least one hinge.

In order to increase the stability of the flexible connection, reflectors movably connected to one another are preferably interconnected by means of two or more, preferably by means of exactly two, hinges.

Here, by way of example, the at least two hinges have different normal distances from a plane in which the reflectors are movable relative to one another. For the case that the above-mentioned plane for example is horizontal, the hinges are then arranged one above the other.

The hinge or the plurality of hinges is/are preferably formed as a plastic hinge or plastic hinges respectively.

For simple production and for the stability of the double or multiple reflector, it is advantageous if the hinge or the plurality of hinges is/are formed in one piece with the reflectors.

It has proven to be particularly suitable for the invention if the hinge or the plurality of hinges is/are formed as a film hinge or as film hinges respectively.

In accordance with a specific embodiment of the invention the reflectors are formed as plastic reflectors. In particular this embodiment is suitable for a one-piece manufacture of the entire dual reflector or multiple reflector according to the invention.

The present invention is of particular importance for light modules in which the at least one light source is an LED light source, wherein each LED light source comprises one or more light-emitting diodes. In particular in the case of LED light sources an exact referencing of the reflectors in relation to the light sources is of significance.

In order to position/reference and/or fasten the reflectors on the carrier plate, the reflectors preferably have, on the sides thereof facing a carrier plate for the LED light sources in the fastened state, fastening elements and/or referencing elements, by means of which the reflectors can be positioned on corresponding fastening elements or referencing elements of the carrier plate.

By way of example, the fastening elements and/or referencing elements of the reflectors are formed as protruding pins (protruding from the reflectors).

The fastening elements and/or the referencing elements on the carrier plate are preferably formed as bores corresponding to the protruding pins, preferably as through-bores.

Figure 2:
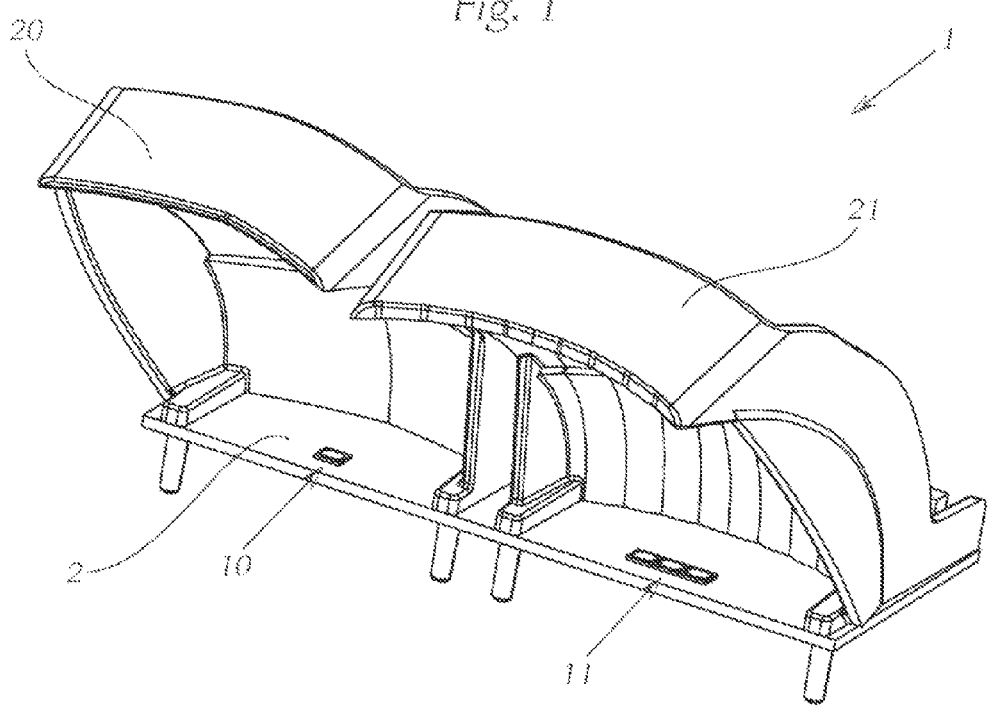
Figure 3:
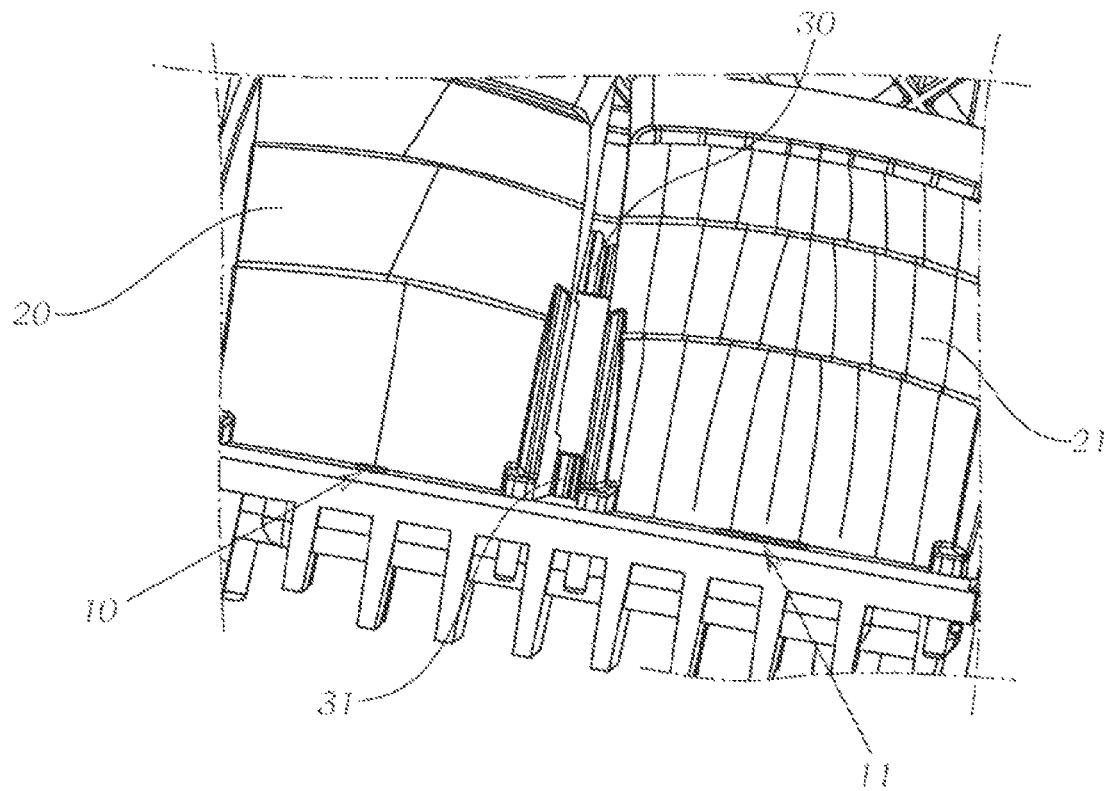
Figure 4:
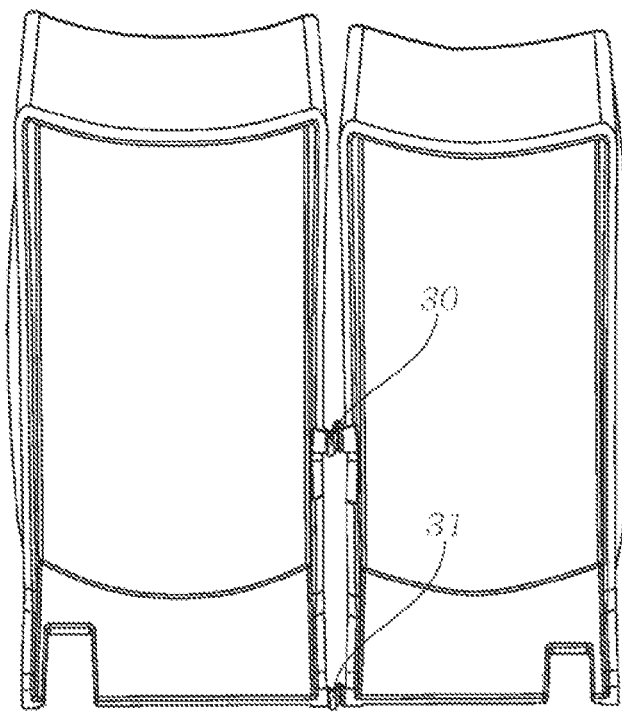
Figure 5:
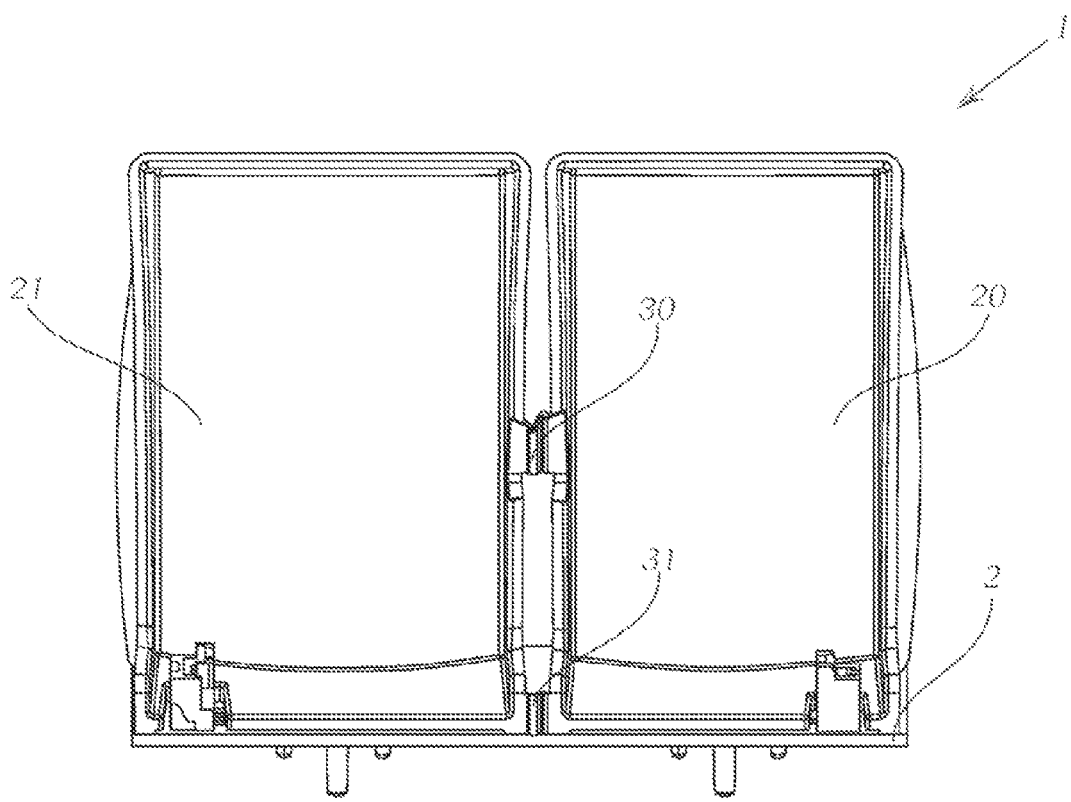
Figure 6:
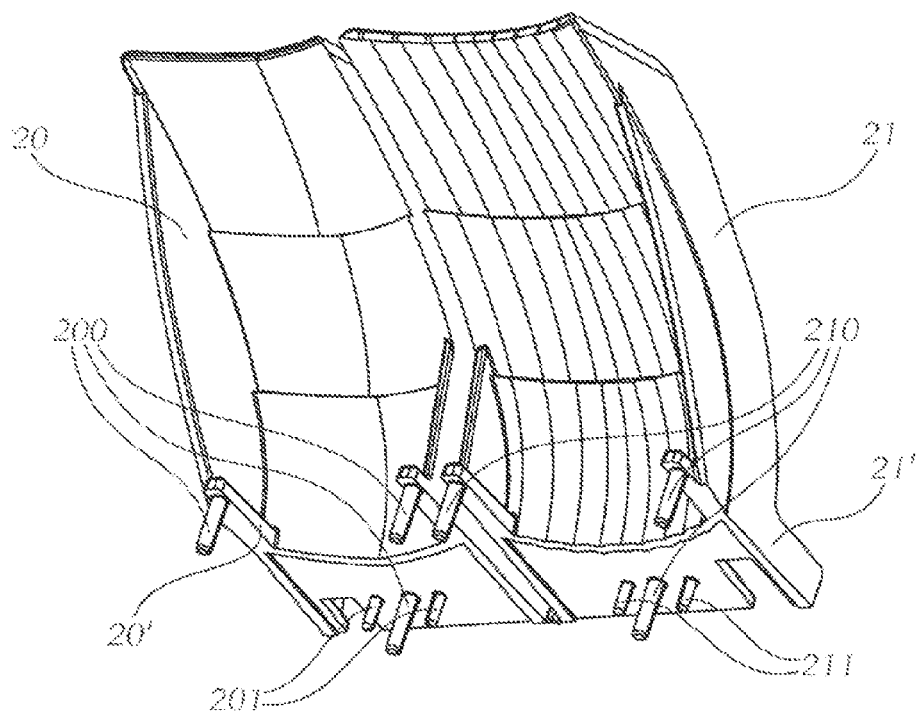
Figure 7:
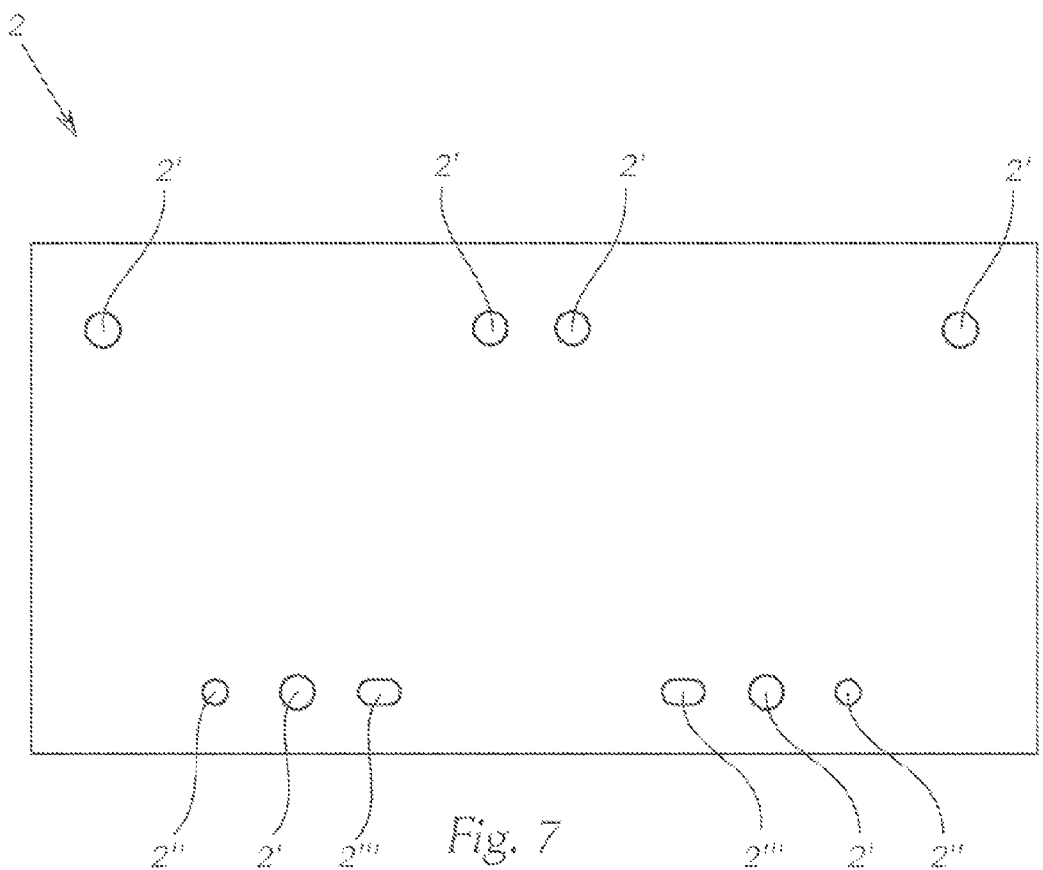
Figure 8:
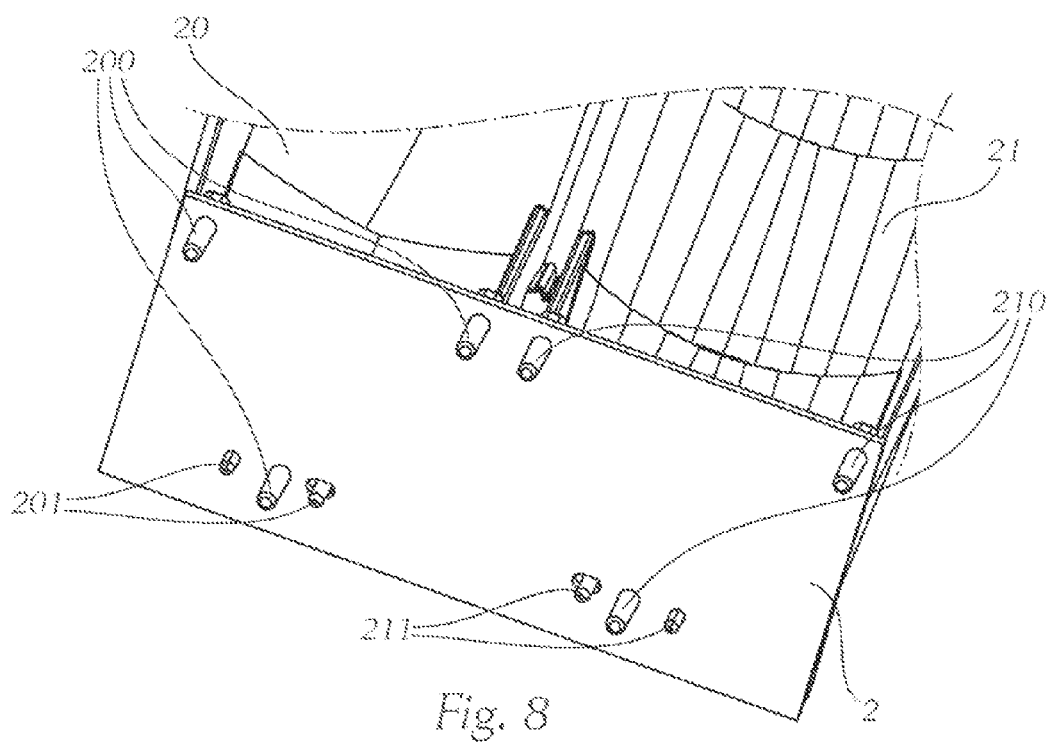

The invention will be explained in greater detail hereinafter on the basis of the drawing, in which FIG. 1 shows the components of a light module essential to the invention in a perspective view, FIG. 2 shows the double reflector from FIG. 1 on a carrier plate for two LED light sources, FIG. 3 shows a detailed view of the reflectors or of the double reflector of a light module from FIG. 1, FIG. 4 shows two reflectors in the region of the flexible connection thereof, FIG. 5 shows the illustration of FIG. 4 in a view from the front, FIG. 6 shows the double reflector in a perspective view from below, FIG. 7 shows an unfitted carrier plate with a view of the bores thereof, and FIG. 8 shows a carrier plate for the LED light sources with positioned double reflector in a view from below.

FIG. 1 shows a light module 1 for a motor vehicle or a motor vehicle headlamp, wherein only the components relevant to the invention are illustrated in the figures.

In the shown embodiment the light module 1 has two light sources 10, 11, wherein the two light sources are LED light sources. One of the two LED light sources 10 comprises, in this example, one LED, whereas the other LED light source 11 comprises three LEDs.

By way of example, the LED light source 10 is used to generate a first light distribution (or a first part of a light distribution), whereas the LED light source 11 is used to generate a second light distribution (or a second part of a light distribution).

The two LED light sources 10, 11 are positioned in defined positions relative to one another, and a reflector 20, 21 is associated with each of the two LED light sources 10, 11, via which reflectors the light emitted by the LED light source 10, 11 associated therewith is irradiated into the outside space.

The LED light sources 10, 11 are mounted here on a carrier plate 2, which is an LED circuit board 2. The LED circuit board 2 itself is mounted on a heat sink 3, for example the circuit board 2 and heat sink 3 are adhesively bonded to one another.

In accordance with the invention the two reflectors 20, 21 now form a double reflector by being movably connected to one another. The double reflector is illustrated again in FIG. 2 in another view together with the circuit board 2.

In the illustrated embodiment the two reflectors 20, 21 are arranged laterally adjacently and are movably interconnected accordingly in the side regions thereof.

The movable connection between the two reflectors 20, 21 is established preferably with hinges 30, 31, as can be clearly seen in particular in FIGS. 3-5. In the shown embodiment precisely two hinges 30, 31 are provided, which are arranged one above the other in the installed position of the light module 1.

In accordance with the invention a double or multiple reflector is created, in which at least two reflectors are connected to one another movably, that is to say in a flexible manner, such that at least these two reflectors can be positioned independently of one another to a certain extent and thus can also be referenced optimally in relation to their respective associated light sources.

The hinges are preferably formed as film hinges 30, 31.

The hinges 30, 31 are typically formed in one piece with the two reflectors 20, 21. It is particularly favourable in terms of manufacture if the reflectors and the hinges are formed from a plastic, such that simple, one-piece production can be provided and a corresponding flexibility of the hinge is provided by the plastic.

In order to position/reference the reflectors 20, 21 on the circuit board 2, the reflectors 20, 21 have, on their sides facing the circuit board 2 in the fastened state, referencing elements 201; 211. To this end, the reflectors 20, 21 preferably have a base area 20', 21', on which the referencing elements 201; 211 are mounted, for example are formed in one piece therewith.

The referencing elements 201; 211 of the reflectors 20, 21 are formed here as pins 201; 211 protruding from the reflectors or from the reflector bases 201, 21'.

Furthermore, fastening elements 200, 210 are mounted on the reflector bases 20', 21', preferably are formed in one piece with the bases, by means of which fastening elements the reflectors 20, 21 can be fastened to the circuit board 2.

The referencing elements 201, 211 and fastening elements 200, 210 are formed here as pins protruding from the bases 20', 21'. As can be clearly seen in FIG. 6, the pins 200, 210 here in the present embodiment are thicker than the pins 201, 211.

The two reflectors 20, 21 of the double reflector can be referenced on the circuit board 2 in the desired position by means of the reference pins 201, 211.

The reference system on the carrier plate or circuit board 2 is formed here by bores, preferably through-bores 2", 2''' in the circuit board 2, in which the reflectors 20, 21 are positioned via the reference pins 201, 211 thereof.

With a specific manufacturing method, the LED light sources are for the time being arranged on the circuit board 2, the position thereof is measured (for example by means of optical measurement), and the reference bores 2", 2''' are then produced for exact positioning of the reflectors 20, 21 or reference pins 201, 211 thereof.

The two bores 2''' are formed here as slots, such that a tolerance compensation is possible for an inaccurately manufactured reflector. With a very accurately manufactured reflector, however, the bores 2''' may also be circular.

The reflectors 20, 21 or reflecting surfaces thereof are preferably coordinated with the reference pins 201, 211 that are associated with the circular bores 2" adapted exactly to the reference pins.

The bores 2' in the circuit board 2 are associated with the fastening pins 200, 210 of the reflectors 20, 21 (see FIGS. 7 and 8). Once the reflectors have been inserted into their respective intended position, the pins 200 and 210 are hot press fit in the bores 2'. The reflectors are thus fixed in the position that is optimal for them in terms of lighting.

Due to the movable connection of the two reflectors 20, 21, it is made possible for the first time that both reflectors, even though they are formed in one piece with one another and thus form a structural unit, can be brought into the position intended therefor, which in the case of rigidly interconnected reflectors would be possible only in rare exceptional cases.

The reference bores 2" and the slot 2''' should fit together here as accurately as possible with the diameter of the reference pins 201, 211. The bores 2' can easily have a slightly larger diameter than the pins 200, 210. Due to the hot press fitting, the reflector is ultimately fastened as in the case of a rivet connection, such that a relatively large play between the bores 2' and the thick pins 200, 210 (which are also referred to as joining domes) is not problematic.

The bores 2", 2''' do not necessarily have to have the same normal spacing from the LED light source thereof, since it may be desirable that the reflector is oriented in a manner slight rotated about the vertical axis in relation to the LED light source.

In another embodiment (not illustrated) the bores 2", 2''' and the pins 201, 211 can be omitted. The reflectors are inserted via the pins 200, 210 into the bores 2', wherein these bores 2' are sufficiently large so that the pins 200, 210 can be displaced slightly in the plane of the circuit board 2 and the reflectors 20, 21 can thus be optimally positioned. The reflectors are independently displaced, which is possible by the movable connection thereof, until an optimal light exposure is achieved. The reflectors are fixed in this position, for example again by hot press fitting of the pins 200, 210.

In this variant the position of the reflectors can still be adjusted to a certain extent following insertion into the carrier and prior to the fixing, provided this permits the flexible connection.

In both variants it is true that the reflectors are referenced in relation to the carrier plate 2, on which the LED light sources are also arranged, such that the reflectors are positioned de facto in relation to the respective associated LED light source. Due to the movable connection of the reflectors, it is ensured that both (all) reflectors can be positioned as intended in relation to their LED light source.

The circuit board itself is, as already mentioned, usually mounted prior to the fastening of the reflectors on the heat sink, for example is adhesively bonded thereto. So that there is sufficient space on the reflectors for the pins, the heat sink is also provided at the suitable points with bores, wherein these, however, may easily be larger than the diameter of the pins, since the bores in the heat sink are not crucial for the exact positioning.

The fastening or fixing of the reflectors has been illustrated in the shown example on the basis of hot press fitting, however other methods are also conceivable, such as screwing or hot forming.

The invention claimed is:

1. A light module for a motor vehicle headlamp, the light module comprising:
   two or more LED light sources, which are each positioned in defined positions relative to one another; and
   two or more reflectors, which are each associated with a single LED light source of the two or more LED light sources,
   wherein the two or more reflectors are movably connected by at least one film hinge;
   wherein the two or more LED light sources are mounted on a circuit board, and
   wherein each of the two or more reflectors is positionable and referenceable independently of the other reflector(s) on the circuit board with respect to the LED light source associated therewith to an extent provided by a flexibility of the at least one film hinge.

2. The light module according to claim 1, wherein at least one of the two or more reflectors is movably connected to all adjacent reflectors.

3. The light module according to claim 1, wherein each of the two or more reflectors is movably connected to one or more reflectors adjacent thereto.

4. The light module according to claim 1, wherein the two or more reflectors are arranged laterally adjacent to one another.

5. The light module according to claim 1, wherein the two or more reflectors are arranged movably relative to one another in a plane.

6. The light module according to claim 5, wherein the two or more reflectors are movably mounted in a common plane.

7. The light module according to claim 1, wherein the at least one film hinge comprises two or more film hinges.

8. The light module according to claim 7, wherein the two or more film hinges have different normal distances from a plane in which the two or more reflectors are movable relative to one another.

9. The light module according to claim 7, wherein the two or more reflectors are interconnected by exactly two film hinges.

10. The light module according to claim 1, wherein the at least one film hinge is a plastic hinge.

11. The light module according to claim 1, wherein the two or more reflectors are formed as plastic reflectors.

12. The light module according to claim 1, wherein each LED light source comprises one or more light-emitting diodes.

13. The light module according to claim 1, wherein the two or more reflectors have, on their sides facing the circuit board for the LED light sources in a fastened state, fastening elements with which the two or more reflectors are fastened to corresponding fastening elements of the circuit board, and wherein the two or more reflectors have, on their sides facing the circuit board for the LED light sources in a fastened state, referencing elements with which the two or more reflectors are positioned on corresponding referencing elements of the circuit board.

14. The light module according to claim 13, wherein the fastening elements and/or the referencing elements of the two or more reflectors are formed as protruding pins.

15. The light module according to claim 14, wherein the fastening elements and/or referencing elements on the circuit board are formed as bores corresponding to the protruding pins.

16. A vehicle headlamp comprising one or more light modules according to claim 1.

17. The light module according to claim 1, wherein the two or more reflectors are interconnected by a plurality of film hinges that are formed in one piece with the two or more reflectors.

\* \* \* \* \*